(12) United States Patent
Pizzo et al.

(10) Patent No.: US 10,430,759 B2
(45) Date of Patent: Oct. 1, 2019

(54) SYSTEMS AND METHODS FOR DISCOVERING A PERFORMANCE ARTIST

(71) Applicant: VIACOM INTERNATIONAL INC., New York, NY (US)

(72) Inventors: Vincenza Pizzo, New York, NY (US); Joel Sanders, New York, NY (US)

(73) Assignee: Viacom International Inc., New York, NY (US)

( * ) Notice: Subject to any disclaimer, the term of this patent is extended or adjusted under 35 U.S.C. 154(b) by 597 days.

(21) Appl. No.: 14/135,891

(22) Filed: Dec. 20, 2013

(65) Prior Publication Data

US 2015/0177913 A1 Jun. 25, 2015

(51) Int. Cl.
*G06Q 10/10* (2012.01)
*G06Q 50/00* (2012.01)

(52) U.S. Cl.
CPC ............ *G06Q 10/10* (2013.01); *G06Q 50/01* (2013.01)

(58) Field of Classification Search
CPC ................................................. G06F 17/30861
USPC ........ 715/769, 760, 753, 765, 800, 716, 758
See application file for complete search history.

(56) References Cited

U.S. PATENT DOCUMENTS

| | | | |
|---|---|---|---|
| 7,302,468 B2 | 11/2007 | Wijeratne | |
| 7,680,770 B1 | 3/2010 | Buyukkokten et al. | |
| 8,166,016 B2 | 4/2012 | Higgins et al. | |
| 8,166,026 B1 | 4/2012 | Sadler | |
| 8,204,878 B2 | 6/2012 | Amer-Yahia et al. | |
| 8,340,796 B2 | 12/2012 | Stefik | |
| 8,370,396 B2 | 2/2013 | Blaxland et al. | |
| 2008/0222546 A1* | 9/2008 | Mudd | G06F 17/30749 715/765 |
| 2008/0250035 A1 | 10/2008 | Smith et al. | |
| 2010/0005087 A1 | 1/2010 | Basco et al. | |
| 2012/0216296 A1 | 8/2012 | Kidron | |
| 2012/0221382 A1 | 8/2012 | Kidron | |
| 2012/0221559 A1 | 8/2012 | Kidron | |
| 2012/0221645 A1 | 8/2012 | Anthru et al. | |
| 2012/0221951 A1 | 8/2012 | Kidron | |
| 2012/0222061 A1* | 8/2012 | Anthru et al. | 725/28 |
| 2012/0254188 A1 | 10/2012 | Koperski et al. | |
| 2012/0270527 A1 | 10/2012 | Smith et al. | |
| 2012/0303710 A1 | 11/2012 | Roberts et al. | |
| 2012/0311034 A1 | 12/2012 | Goldband et al. | |
| 2013/0096981 A1* | 4/2013 | Evans | G06Q 30/0201 705/7.29 |
| 2013/0198321 A1* | 8/2013 | Martin | H01L 43/12 709/217 |
| 2013/0205243 A1* | 8/2013 | Rivera | G06F 3/04817 715/776 |
| 2013/0238419 A1* | 9/2013 | Glick | G06Q 30/0242 705/14.41 |
| 2014/0282114 A1* | 9/2014 | Walkin | H04L 51/32 715/758 |

* cited by examiner

*Primary Examiner* — Cao H Nguyen

(74) *Attorney, Agent, or Firm* — Fay Kaplun & Marcin, LLP

(57) ABSTRACT

Described herein are systems and methods for discovering performance artists across multiple sources of relationships between the artists. A method may comprise receiving a user request for content of a primary artist from a user media device, identifying a social connection between the primary artist and a secondary artist within at least one social network, and providing to the user media device a user recommendation for content of the secondary artist based on the identified social connection between the primary and secondary artists.

17 Claims, 3 Drawing Sheets

SYSTEMS AND METHODS FOR DISCOVERING A PERFORMANCE ARTIST

BACKGROUND

The term "application software" refers to any computer software that causes a computer to perform functional tasks beyond the running of the computer itself. Application software applies the power of a particular computing platform or system software to a particular purpose. Specific instance of this software are called software applications, applications or simply "apps." The term app is used in contrast to system software that typically manages and integrates the capabilities of a computing device but does not directly perform tasks that benefit the user. In other words, the system software serves the app, while the app in turn serves the user.

In recent years, the term "mobile app" has been used to primarily refer to applications for mobile computing devices such as smartphones, tablets, etc. Mobile apps are usually available to a consumer through various application distribution platforms, such as "app stores," that are typically operated by the owner of the mobile operating system for the mobile computing device. While mobile apps were originally offered for general productivity and information retrieval (e.g., email, calendar, contacts, etc.), the functionality of mobile apps has expanded into other categories such as stock market and weather information, GPS and location-based services, banking, order-tracking, and entertainment such as mobile games and media presentation. In the field of media presentation, mobile apps are used to provide an end user with streaming multimedia to the mobile computing device. Streaming multimedia refers to media that is constantly received by and presented to an end-user while being delivered by a content provider.

Furthermore, the term "social media" has been used primarily to refer to the techniques for interacting among people by creating, sharing, and exchanging information and ideas in virtual communities and networks. Social media may include a group of Internet-based applications (e.g., mobile apps) that allow this creation and exchange of such user-generated content. Those skilled in the art would understand that social media may rely on mobile and web-based technologies to create increasingly interactive platforms for individuals and communities share, create, discuss, and modify user-generated content. Accordingly, mobile technologies, such as mobile apps, introduce substantial changes and a broader reach in the communication between organizations, communities, and individuals within a social media network.

SUMMARY

Described herein are systems and methods for discovering performance artists across multiple sources of relationships between the artists. A method may comprise receiving a user request for content of a primary artist, identifying a social connection between the primary artist and a secondary artist within at least one social network, and providing a user recommendation for content of the secondary artist based on the identified social connection between the primary and secondary artists.

Further described herein is a system comprising a graphical user interface ("GUI") for discovering performance artists across multiple sources of relationships between the artists, and a processor receiving a user request for content of a primary artist, identifying a social connection between the primary artist and a secondary artist within at least one social network, and providing a user recommendation for content of the secondary artist based on the identified social connection between the primary and secondary artists.

Further described herein is a non-transitory computer readable storage medium with an executable program stored thereon, wherein the program instructs a processor to perform the following steps: receiving a user request for content of a primary artist, identifying a social connection between the primary artist and a secondary artist within at least one social network, and providing a user recommendation for content of the secondary artist based on the identified social connection between the primary and secondary artists.

DETAILED DESCRIPTION

Figure 1:
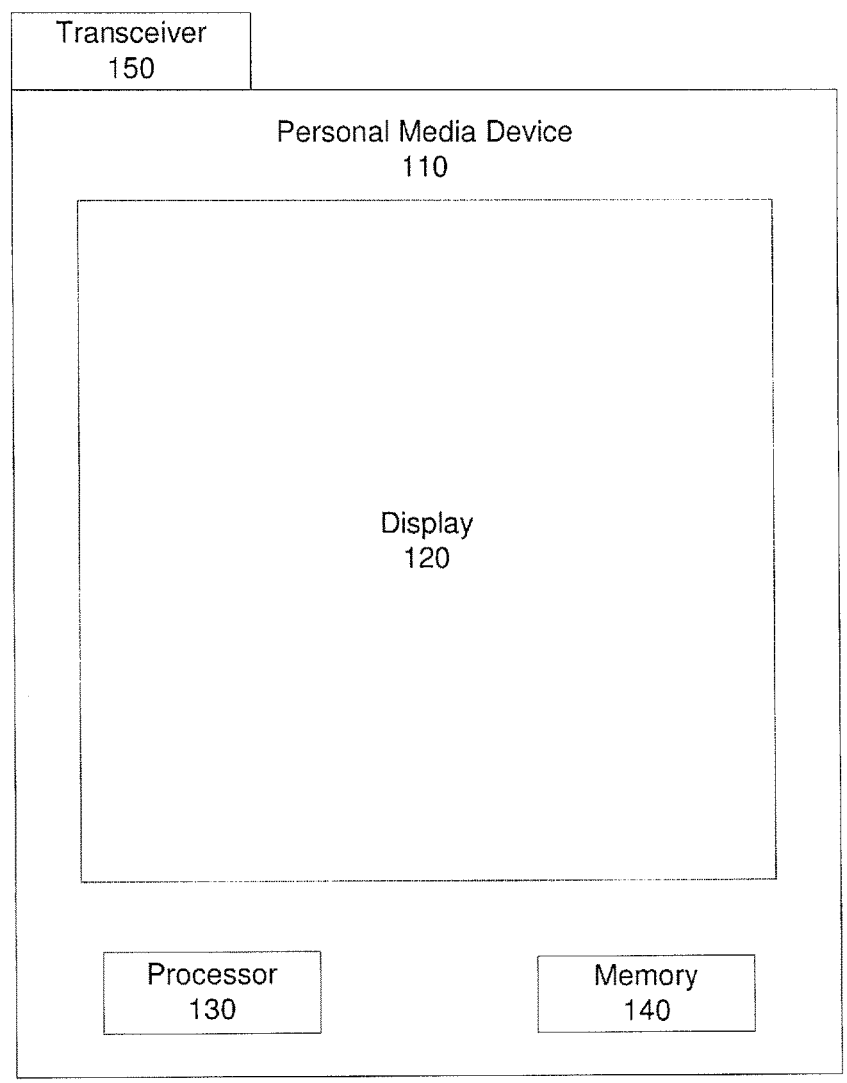
FIG. 1 shows an exemplary system for discovering performance artists across multiple sources of relationships between the artists according to an exemplary embodiment described herein.

The exemplary embodiments may be further understood with reference to the following description and the appended drawings, wherein like components are referred to with the same reference numerals. The exemplary embodiments show systems and methods for a media application including an interactive user interface for exploring performing artists, such as, for example, stand-up comedians. In addition, the exemplary embodiments may also allow for the user to discover the manner in which artists may be related to each other across multiple sources of relationships. For instance, the various relationships between artists may include social connections, editorial connections, performance appearances connections, social media connections, common work connections, user activity, etc.

The various connections between artists may be provided by multiple services using a ranking system in order to find one or more most likely connections (e.g., best match) to present relevant relationships for the user to explore and receive content from the related artists. According to an exemplary embodiment of the systems and methods described herein, the content may be presented to the user via an interactive software application, wherein the content may include instant video clips, on-demand videos, full-length episodic video content, photographs, news and media feeds, artist websites, performance schedules, etc.

While the exemplary embodiments described herein may relate to a dedicated software application executing on a user device, such as a tablet computer, one skilled in the art will understand that the interactive user interface for exploring performing artists may be either a stand-alone software package or an integrated software component executing on a computing device. Furthermore, while the exemplary embodiments described herein may relate to discovery of performance artists, such as stand-up comedians, one skilled in the art will understand that systems and methods described herein for identifying and ranking relationship connections may be applied towards the discovery of any type of content including content related to, but not limited to, music, movies, television programming, books, social networking, professional networking, etc.

As will be described in greater detail below, examples of relationships between artists may include connections based on editorials, genres, tags, user-defined relationships, site programming, user activity, etc. For instance, relationships between artists may be influenced by editorial programming through categorizing artists into genres, providing descriptive tags for content (e.g., video clips), programming specific content (e.g., playlists) for a viewer via the dedicated software application or a website on a web browser, etc. Furthermore, relationships may be established by providing direct links between artists within the software application or the website.

Artists may be categorized into multiple genres to provide a broad set of artists to establish relationships between. For instance, comedians may be grouped with other comedians based on material, style, target audience, etc. (e.g., political satire, dark humor, "blue collar" comedy, etc.). Accordingly, a user may search one or more genres associated with a specific comedian and then may be presented with other comedians within the same genres. For example, a comedian such as Jeff Foxworthy may be categorized into the "blue collar comedy" genre. A user search through this genre may be presented with results featuring artists such as Larry the Cable Guy, Bill Engvall, and Ron White. Thus, these results may be considered strongly connected by performing material of a similar type.

In addition to categories based on genres, content from the artists may include meta elements, such as tags or keywords used to identify one or more attributes of the content. For instance, individual performance clips may be tagged for topical content in order to search for videos that explore similar themes. A video clip from a specific comedian tagged with the term "marriage" may produce a connection to another comedian, as well as a further video clip, since both comedians had segments that explore the topic of marriage.

The exemplary systems and methods described herein may also allow for connections to be established based on producer defined relationships. When a know relationship exists between two or more artists that may not necessarily be provided for in other locations, editorial connections may be created directly between artists. For example, a relationship between comedians such as Lisa Lampanelli and Larry the Cable Guy may be established by the producer based on a shared performance or program, such as the Comedy Central Roast of Larry the Cable Guy wherein Lisa Lampanelli was the host of the program.

Further methods of categorizing artists and/or artist content may include site programming. As a user receives artist content (e.g., watches a video clip, listens to an audio track, etc.) over a website or a dedicated software application, the user's activity may be tracked for research, and subsequently mined into a separate service to discover relationships between the content. Furthermore, the tracking may be influenced by editorial through playlists that are provided for both the website and the software application if the users are watching multiple videos that come from different artists. Accordingly, this method may serve as an indirect technique of influencing the connections between artists since the tracking of the website and software application visits may be influenced by users exploring throughout the content.

In addition to site programming, user activity, such as patterns of watching videos, may be tracked and fed into the external service. While editorial programming may influence a user's activity, the user may also be influenced by searches for specific artists for certain content or by browsing through multiple artists and receiving content (e.g., watch video clips). This user activity information may be pooled together to provide connections between content (e.g., video clips) based on what content is most appealing to the user. Accordingly, connections between artists may be established based on the usage patterns of the users. It may be noted that the above-described methods for connecting an artist with one or more artists are examples of any number of techniques for establishing relationships between two or more artists. Accordingly, the exemplary systems and methods described herein for discovering an artist is not limited to these connection techniques.

FIG. 1 shows an exemplary system 100 for discovering performance artists across multiple sources of relationships between the artists according to an exemplary embodiment described herein. The exemplary system 100 may include personal media device 110 (e.g., smartphone, tablet computer, etc.) equipped with a display 120, a processor 130 and a memory 140, such as a non-transitory computer-readable storage medium. The media device 110 may be a computing device such as, for example, tablet, smart phone, notebook computer, a desktop computer, laptop computer, home entertainment console, etc.

As noted above, the display 120 of the device 110 may be a touch screen display for receiving user input. The exemplary processor 130 may receive user input from the display 120, as well as through other components of the device 110. The exemplary memory 140 may store instructions, including instructions related to the above-described software application, executable by the processor 130. Therefore, a user of the device 110 may interact with the software application stored in the memory 140 of the device 110. The processor 130 may process these user interactions and adjust the content presented by the display 120 accordingly.

It may be noted that the software application may interact with any number of components featured on the device 110 in addition to the display 120, processor 130 and memory 140. For instance, the device 110 may include a radio transceiver 150 (e.g., a wi-fi antenna, a cellular antenna, etc.). Using the radio transceiver 150, the software application may communicate with a network to receive updated data (e.g., software updates, content updates, etc.). The device 110 may also include further peripheral components, such as motion sensors, accelerometers, cameras, microphones, speakers, etc. The software application may provide the processor 130 with instructions to interact with any number of these peripheral components. An example of the software application may include a dedicated stand-alone application for delivering artist content to the use of the device 110. A further example of the software application may be an Internet browser for sending and receiving the artist content over a website connect to a network.

Figure 2:
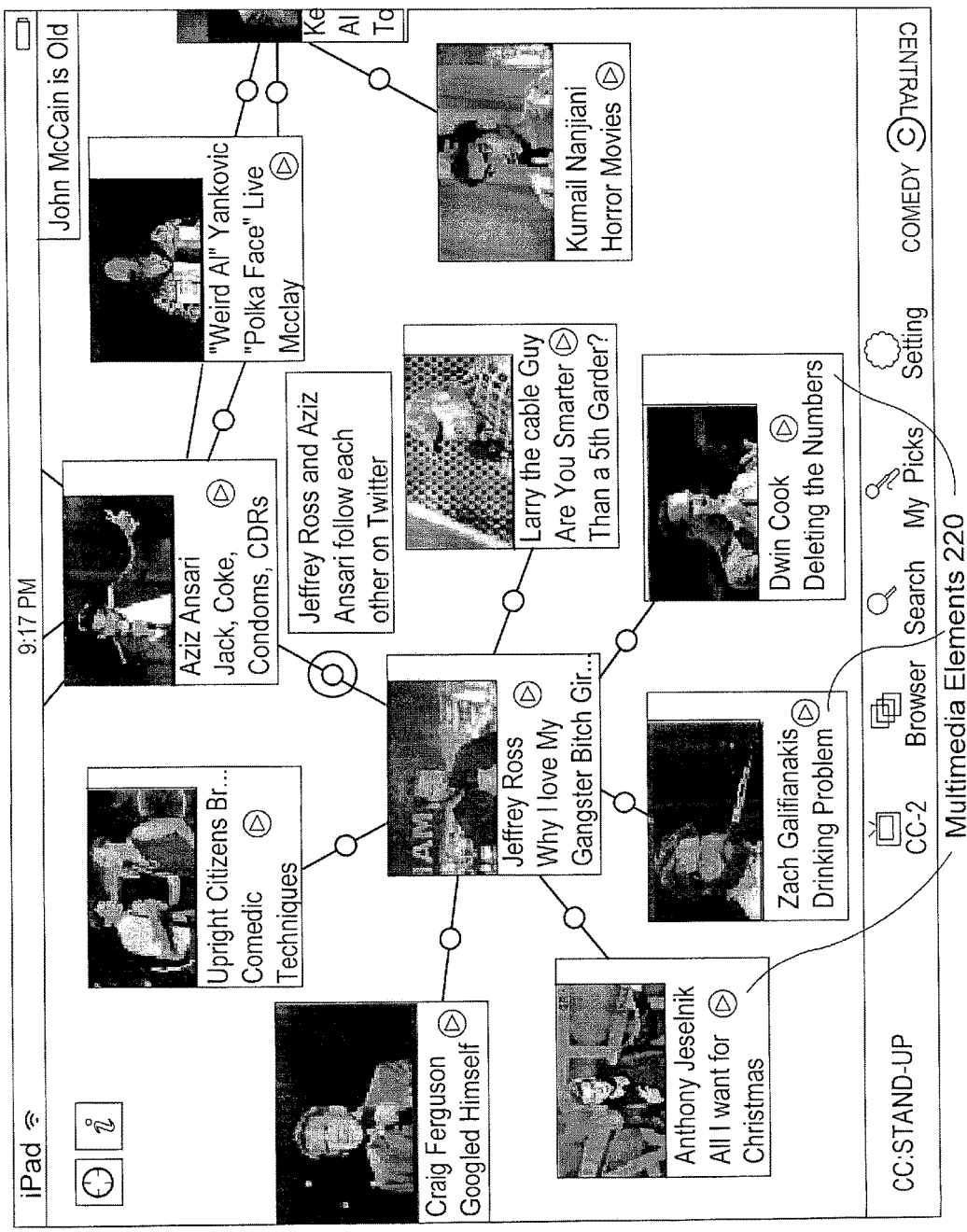
FIG. 2 shows an exemplary graphical user interface ("GUI") on the device running software application for discovering performance artists according to an exemplary embodiment described herein.

FIG. 2 shows an exemplary graphical user interface ("GUI") 200 on the device 110 running the software application according to an exemplary embodiment described herein. As noted above, the software application on the device 110 may present a library of searchable artist content to the user via the display 120. The GUI 200 may feature numerous moveable elements 220 (e.g., tiles, cards, images, etc.) to promote user exploration and discovery of artist content (e.g., video clips) through the software operating on the device 110. In other words, by receiving user input (e.g., touch screen interactions, point and click input, etc.), the user may control the operation and display of various multimedia content via the GUI 200 on the device 120. As noted above, while the exemplary GUI 200 may be described a providing content such as video clips from artists such as comedians, one skilled in the art would understand that the GUI 200 may be used for providing any type of content from any type of artist.

The exemplary GUI 200 may feature an interactive display of selectable multimedia elements, such as video clips, images, tiles, photographs, text boxes, etc. Based on user input (e.g., via touch screen or mouse pointer), the application may adjust the display of the GUI 200 accordingly. For instance, the user may input a swiping gesture to a touch screen of a tablet device running the exemplary software application. The swiping gesture allows the user to shift or pan the selectable multimedia elements within the display. Thus, the user may be provided with omni-directional control of the presentation of the elements within the interactive GUI 200. Furthermore, the user may input a multi-touch gesture to the touch screen, such as pinching gestures to zoom in and out of the display. Additional user inputs may include touch screen taps, long presses, scrolls, flicks, rotations, etc., as well as user input from a peripheral device such as a mouse, a trackball, a camera, a motion sensor, etc.

The interactive display of the GUI 200 may provide the user with artist content such as pre-recorded video segments, live streaming video of artists, etc. As noted above, the user may proactively discover new artists and receive new artist content. Accordingly, for pre-recorded artist content, the GUI 200 may feature selectable buttons or channels for "browse," "discover," "search," "user profile," etc. The GUI 200 may also feature a dedicated button/channel for both live and "pseudo-live" video streams. Live video streams may be scheduled special events featuring one or more artists. Pseudo-live video stream may be a block of looping video playback of recorded video segments.

In addition, the exemplary software application may adjust the elements/tiles 220 within the interactive GUI 200 based on at least any of the interactions listed above. For instance, the transition from portrait display to landscape display may adjust the number of elements to be displayed on the device as well as the size and/or content of the elements 220. Similarly, the zoom-in and zoom-out features of the software application may adjust the number of elements 220, the size of the elements 220, and/or the content of the elements 220.

Accordingly, the user zooming out or expanding the view of the GUI 200 (e.g., using a touch screen gesture) may allow for the software application to display a greater number of elements 220 within the display 120. However, with a greater number of elements 220 being displayed, the content within the elements 220 (e.g., images, text, etc.) may be reduced or eliminated. Conversely, the user zooming in or contracting the view of the GUI 200 may allow for the software application to display fewer elements within the display 120. With fewer elements 220 being displayed, content associated with each of the elements 220 (e.g., images, text, etc.) may be added to the image or expanded upon.

According to an exemplary operation of the software application on the device 120, the user may click, or tap, on an element 220 in the GUI 200 to send a request to grab a playlist or a "feed" of connected artists. In the feed operation, the software application may provide a set of relationships through a multi-phase process including: data gathering, result scoring, duplication filtering, result blending, etc. Additional connections may be established between artists based on any number of further sources, such as, but not limited to relationship on social media applications, artist influences and influencers, user/fan connections, professional appearances, joint projects and/or works, etc.

The data gathering phase may be an initial phase for establishing relationship that involves the inspection of the user-requested video clip, as well as the user-requested artist. This phase may gather data from all available sources along the various relationship types, such as, but not limited to, genres, tags, user activity, producer defined relationships, etc.

During the result scoring phase, each source of relationship types may be assigned a specific source in order to weight the importance of their respective items. These scores may then be used to rank the best relationship results. In addition, within each source, there may be an option for the results to be score by relevance within the source. This option may be useful for user activity scoring by placing more frequently connected videos ahead of (e.g., higher ranking) less frequently connected videos.

It may be possible for the same artist to appear in connections from multiple sources. In order to provide the best connection to an artist, the duplication filtering may filter a listing of scored results from all sources to remove any duplicates that are ranked after the first occurrence of an artist within the list. For instance, returning the example discussed above, a comedian such as Jeff Foxworthy may be connected to another comedian Bill Engvall in multiple capacities (e.g., genre, tags, video views, etc.). Accordingly, the filter process may limit the appearance of Bill Engvall in the results list based on a single connection. In other words, the software application may simply use the genre connection to list Bill Engvall once as a connection to Jeff Foxworthy.

The results blending phase may provide a wide variety of relationships by establishing limits on the number of each relationship type. In other words, the blending phase may prevent the creation of a loop of data by cycling through all of the artists in a particular genre without finding connections to other artists. Therefore, when pulling the final connection result set together, a specified number of artists may be returned from each type of connection, as available, to provide this variety in the user experience.

As noted above, the software application and data sets for establishing artist connections may continue to evolve as newer relationship sources are integrated into the exemplary systems and methods. Additional sources may include connections derived from social media applications, live and recorded performance appearances, common work projects, etc. For instance, artist connections may be established based on a relationship status (e.g., friends, followers, etc.) between artists in social media networks. In other words, if two artists are either friends or followers of one another in an external network, this information may be used to establish a connection between the two artists.

Further consideration for establishing artist connections may include artist influences and artist influencers. For instance, it may be inferred that a first artist may be an influence over a second artist if the second artist "follows" the first artist without being followed back by the first artist. For example, if Jeff Foxworthy is followed by Ron White, but Jeff Foxworthy does not follow Ron White, then the relationship of influence may be, established connecting Ron White to Jeff Foxworthy with the notation of "follow by." Conversely, artist influencers may be a social relationship in the inverse of influence relationship. In the example discussed above where Jeff Foxworthy does not follow Ron White back, it may be inferred that Jeff Foxworthy is an influence on Ron White, and the relationship may be connected with the notation of "follows."

User-based social relationships may also be considered when establishing connections between artists. For instance, the listings of artists followed by users via social relationships may be mined for possible connection data. Where there are larger numbers of overlap for users on a social network following a specific artist, a relationship may be inferred. For example, if many of the users following Jeff Foxworthy overlap many of the users following Larry the Cable Guy, a relationship may be established with the notation of "users who follow Jeff Foxworthy also follow Larry the Cable Guy."

Additional relationships between artists may be established based on professional connections (e.g., appearances, joint projects, etc.). For instance, artists who appear on the same television program or motion picture, or are working on a common project, may be connected through this professional relationship. Furthermore, artists who have performed together (e.g., comedy tours, musical tours, etc.), or who are scheduled to tour together, may be connected through this professional relationship.

According to the exemplary systems and methods described herein, new artist connections and artist content may be determined and/or added to the software application via updates on a periodic basis (e.g., weekly, daily, etc.). As noted above, the device 110 operating the software application may include a radio transceiver 150 (or other network interface) to receive content and software updates. The newer content may include relationship tags (e.g., artist name, material description, topic information, etc.) and be added to the display 120.

One feature of the software application may be to display one or more relationship branches between the elements 220 of the GUI 200. The relationship branch may be in the form of a line linking to video segments with an information button along the line. The information button may inform the user as to the specific relationships shared by the two artists connected by the relationship branch, such as, for example, information indicating that the artist performed together, the content of the two segments are similar, one artists is an influence to the other artists, etc.

A further feature of the software application may allow for the user to select specific content or content theme as a user favorite. For instance, the user may select one or more artists or artist content as a user favorite within the user profile channel. In addition, the user may select all content related to a specific connection type (e.g., genre, tags, etc.) as being user favorite content. The user favorite content option may allow for the user to easily track artists and their content that is most interesting to that user. Furthermore, the user may also be provided with a listing of recently access artist content (e.g., recently watched video segments) within the user profile channel.

The software application presenting the artist content to the user may feature any number of interactive components. For instance, the software application may include a media player with a program guide overlay, allowing the user to control the playback of the content and/or navigate the player to further content. The exemplary media player may include various display options such as picture-in-picture display, full screen display, playlist display, artist relationship branched display, etc. The display 120 may include a "get more information" button to display a detailed description of the artist and/or the artist content. The display 120 may also include a "related" button to display any additional artists connected to a specific artist. The display 120 may include a "share" button to allow the user to email, text, or otherwise interact with other users.

Additional interactive experiences available through the exemplary software application may include hyperlinks to web-based content. For instance, the application may feature one or more hyperlinks directing a browser of the device 110 to various homepages of a content provider. In addition, the application may feature hyperlinks to other web-based interactions, such as loading media players, visiting social media websites, viewing an application market, recommending or downloading other software applications, etc.

The software application may also feature an "auto-play" mode, wherein artist content is automatically presented to the user without any user interaction. For instance, the software application may enter auto-play follow a predetermined period of time without any user interaction (e.g., a timeout period). The artist content provided to the user during an auto-play session may be based on a relationship between a user-selected artist and a further artist. The auto-play session may also present featured or promotional content to the user. Accordingly, the auto-play mode may also serve as a demonstration of the capabilities of the software application. Furthermore, the auto-play mode may be interrupted at any time through user interaction. For instance, if the user touches the display 120 of the device 110 during the auto-play session, the software program may return to displaying the content requested by the user.

Figure 3:
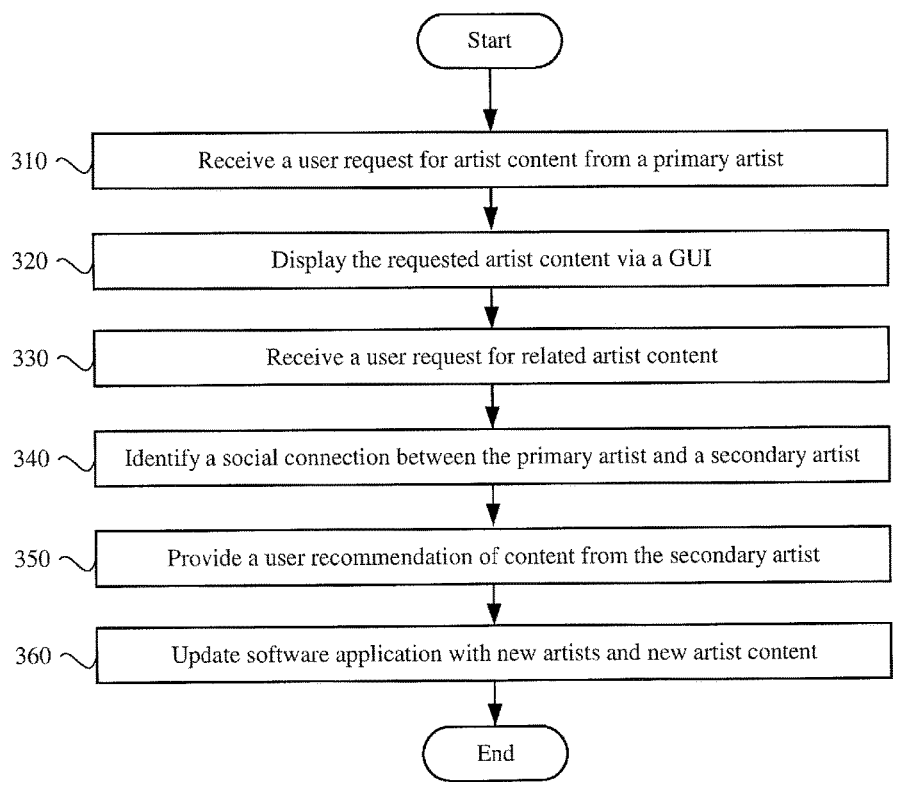
FIG. 3 shows an exemplary method for discovering performance artists across multiple sources of relationships between the artists according to an exemplary embodiment described herein.

FIG. 3 shows an exemplary method 300 for discovering performance artists across multiple sources of relationships between the artists according to an exemplary embodiment described herein. The step performed by the method 300 will be described in reference to the exemplary system 100 and GUI 200 and their respective components as described above with reference to FIGS. 1 and 2. For instance, the software application may include a set of instructions executable by the processor 130 of the personal media device 110, wherein the set of instructions include the method 300.

As described above, the interactive GUI 200 may include any number of multimedia elements 220 (e.g., video clips) delivered to the software application by a content provider. While the exemplary multimedia elements 220 may related to artist content, such as stand-up comedy segments, any type of content may be presented by the software application, such as, but not limited to, other entertainment content, educational content, advertising/promotional content, etc. Furthermore, examples of the content may include audio and/or video clips, full-length programming episodes, commercials, social media and/or news feeds, etc.

In step 310, the method 300 may receive a user request for artist content of a primary artist via the GUI 200 of the device 110. As noted above, the GUI 200 may provide the user with a search interface, such as a search box or a search channel. From this search interface, the user may provide the software application with search criteria, such as the name of an artist, a genre, a tag/topic, a program title, a venue name, etc. The exemplary search interface may include any number of various search filters to assist the user during the searching process.

In step 320, the method 300 may display the requested artist content to the user via the GUI 200. In step 330, the method 300 may receive a user request for further artist content related to the primary artist. For instance, the GUI 200 may provide the user with a branched relationship interface to display any artists and/or artist content connected to the primary artist and/or the requested artist content.

In step 340, the method 300 may identify a social connection between the primary artist and a secondary artist within at least one social network. As detailed above, any number of techniques may be utilized to establish one or more connections between the primary artist and the requested content to further content. For instance, the primary artist may have a relationship on a social media network with a secondary artist. In other words, the primary artist may have a social network status of "friend" or "follower" the secondary artist. Accordingly, this secondary artist may be considered as connected to the primary artist by way of a specific relationship.

In step 350, the method 300 may provide a user recommendation for content of the secondary artist based on the identified social connection between the primary and secondary artists. Accordingly, the exemplary software application may allow the user to explore relationships between artists through various artist content (e.g., video clips) as a manner of discovering new artist related to the initial user request for content.

In step 360, the method 300 may update the software application with additional data related to new artist relationships, new artist content, and new artist entries. As noted above, the software application may execute on a user device 110 (e.g., a tablet computer) that includes a radio transceiver 150. For instance, the software application may interface for the network via the transceiver 150 to query the content provider on the availability of newer content. Accordingly, the software application may periodically connect to a network, such as on a daily basis or a per-use basis, to receive and download the latest content available to the interactive GUI 200.

According to the exemplary systems and methods described herein, the software application may deliver content-on-demand and/or live streaming content to the user on a reoccurring basis. The software application may allow for new material and new artists to be introduced to a user base in an interactive manner. For instance, the content may include spin-off content from existing programming. The content may also serve as a companion component to additional content delivered through different mediums (e.g., television programming). For instance, the content from the software application may provide the user with more detailed information about a program currently airing on television, thereby providing the user with a more in-depth viewing experience.

Those of skill in the art will understand that the above-described exemplary embodiments may be implemented in any number of matters, including as a software application, as a software program, etc. For example, the exemplary method 300 may be embodied in a program stored in a non-transitory storage medium and containing lines of code that, when compiled, may be executed by a processor (e.g., processor 130 of computing device 110). Furthermore, one skilled in the art will understand that the exemplary software application may be coded in any computer readable language, such as, for example, a markup language (e.g., HTML5, etc.).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a user request for primary content of a primary artist from a user media device, the primary content being characterized with a primary content theme;
   identifying a social connection between the primary artist and a secondary artist a social network;
   identifying secondary content of the secondary artist, the secondary content being characterized with a secondary content theme; and
   providing to the user media device a user recommendation for the secondary content of the secondary artist based on the identified social connection between the primary and secondary artists and the identified primary and secondary content themes; and
   displaying a video feed for the content of the secondary artist via a graphical user interface of the user media device; and
   displaying social media overlay including the social connection via the graphical user interface of the user media device.

2. The method of claim 1, further comprising:
   receiving a user request for a related content recommendation via a graphical user interface of the user media device.

3. The method of claim 1, further comprising:
   displaying a video feed for the content of the secondary artist via a graphical user interface of the user media device; and
   displaying social media overlay including the social connection via the graphical user interface of the user media device.

4. The method of claim 1, wherein the social connection indicates one of the primary artists is following the secondary artist and the primary artist is a friend of the secondary artist.

5. The method of claim 1, wherein the social connection includes one of a social media connection, a prior appearance connection, a common work connection, and an editorial connection.

6. The method of claim 1, wherein the social connection indicates that a plurality of users follow both the primary artist and the secondary artist within a social media network.

7. The method of claim 1, wherein the content of the primary artist includes one of an on-demand video segment and a video broadcast feed.

8. A non-transitory computer readable storage medium with an executable program stored thereon, wherein the program instructs a processor to perform actions that include:
   receiving a user request for primary content of a primary artist, the primary content being characterized with a primary content theme;
   identifying a social connection between the primary artist and a secondary artist within a social network;
   identifying secondary content of the secondary artist, the secondary content being characterized with a secondary content theme;
   providing a user recommendation for the secondary content of the secondary artist based on the identified social connection between the primary and secondary artists and the identified primary and secondary content themes; and
   displaying a video feed for the content of the secondary artist via a graphical user interface of the user media device; and
   displaying social media overlay including the social connection via the graphical user interface of the user media device.

9. The computer readable storage medium of claim 8, wherein the actions further include:

receiving a user request for a related content recommendation via a graphical user interface of the user media device.

10. The computer readable storage medium of claim 8, wherein the social connection indicates one of the primary artists is following the secondary artist and the primary artist is a friend of the secondary artist.

11. The computer readable storage medium of claim 8, wherein the social connection includes one of a social media connection, a prior appearance connection, a common work connection, and an editorial connection.

12. The computer readable storage medium of claim 8, wherein the social connection indicates that a plurality of users follow both the primary artist and the secondary artist within a social media network.

13. The computer readable storage medium of claim 8, wherein the content of the primary artist includes one of an on-demand video segment and a video broadcast feed.

14. A device, comprising:
   a memory storing a plurality of rules; and
   a processor coupled to the memory and configured to perform actions that include:
      receiving a user request for primary content of a primary artist, the primary content being characterized with a primary content theme;
      identifying a social connection between the primary artist and a secondary artist within at least one social network;
      identifying secondary content of the secondary artist, the secondary content being characterized with a secondary content theme; and
      providing a user recommendation for the secondary content of the secondary artist based on the identified social connection between the primary and secondary artists and the identified primary and secondary content themes; and
      displaying a video feed for the content of the secondary artist via a graphical user interface of the user media device; and
      displaying social media overlay including the social connection via the graphical user interface of the user media device.

15. The device of claim 14, wherein the social connection indicates one of the primary artists is following the secondary artist and the primary artist is a friend of the secondary artist.

16. The device of claim 14, wherein the social connection includes one of a social media connection, a prior appearance connection, a common work connection, and an editorial connection.

17. The device of claim 14, wherein the social connection indicates that a plurality of users follow both the primary artist and the secondary artist within a social media network.

* * * * *